United States Patent [19]

Benoist et al.

[11] Patent Number: 5,752,804
[45] Date of Patent: May 19, 1998

[54] SECTORED, ONE-PIECE NOZZLE OF A TURBINE ENGINE TURBINE STATOR

[75] Inventors: Josette Benoist, Le Mee s/Seine; Jérome Emmanuel René Jolu, Pringy; Paul Martyez, Montgeron; Jean-Claude Christian Taillant, Vaux le Penil, all of France

[73] Assignee: Societe Nationale d'Etude et de Construction de Monteurs d'Aviation "SNECMA", Paris, France

[21] Appl. No.: 562,598

[22] Filed: Nov. 24, 1995

[30] Foreign Application Priority Data

Dec. 7, 1994 [FR] France .................. 94-14691

[51] Int. Cl.⁶ .................. F04D 29/44
[52] U.S. Cl. .................. 415/209.2; 415/209.3
[58] Field of Search .................. 415/134, 135, 415/136, 137, 138, 139, 209.2, 209.3

[56] References Cited

U.S. PATENT DOCUMENTS

| | | | |
|---|---|---|---|
| 3,860,359 | 1/1975 | De Feo | 415/209.2 |
| 4,126,405 | 11/1978 | Bobo et al. | |
| 4,314,793 | 2/1982 | DeTolla et al. | 415/135 |
| 4,379,560 | 4/1983 | Bakken | 415/135 |
| 4,492,517 | 1/1985 | Klompas | 415/115 |
| 4,863,342 | 9/1989 | Norstrom et al. | 415/134 |
| 5,141,393 | 8/1992 | Marra | |
| 5,333,995 | 8/1994 | Jacobs et al. | 415/209.3 |
| 5,441,385 | 8/1995 | Boyd et al. | 415/209.2 |

FOREIGN PATENT DOCUMENTS

| | | |
|---|---|---|
| 0 192 557 | 6/1986 | European Pat. Off. . |
| 0 526 058 | 2/1993 | European Pat. Off. . |
| 2 624 556 | 6/1989 | France . |
| 518 106 | 2/1931 | Germany . |
| 482 915 | 12/1969 | Switzerland . |
| 216 737 | 6/1924 | United Kingdom . |

*Primary Examiner*—John T. Kwon
*Attorney, Agent, or Firm*—Oblon, Spivak, McClelland, Maier & Neustadt, P.C.

[57] ABSTRACT

A nozzle of a turbine stator of a turbine engine, wherein at least two of the vanes are fixed to each inner platform and to opposite each outer platform, and a maintaining unit is configured to maintain each sector with respect to a case of the turbine stator and to connect sectors together and has a rotational maintaining element, a radial maintaining element and an axial maintaining element. The radial maintaining element is flexible so as to permit a radial expansion of each sector and is constituted by an elastic joint fixed to the case so as to surround the sectors.

3 Claims, 5 Drawing Sheets

SECTORED, ONE-PIECE NOZZLE OF A TURBINE ENGINE TURBINE STATOR

BACKGROUND OF THE INVENTION

The invention relates to the high pressure turbine of a turbine engine such as the turbojets used on an aircraft. It more specifically relates to the sectored, one-piece structure of the high pressure turbine stator nozzle.

DISCUSSION OF THE BACKGROUND

Existing or future turbine engines, such as the turbojets equipping civil and military aircraft, must have high performance characteristics, but must also have a light weight and only require easy, less frequent and therefore less costly maintenance. The taking account of these aims makes it necessary for aircraft manufacturers to reconsider the definition of certain or all the parts of such turbine engines.

With reference to FIG. 1, concerning the high pressure turbine 1 of the turbine engine, the stator is in most cases formed by sectors constituted by several vanes 2 connected by platforms. It is consequently frequent to find sectors formed by two vanes 2 linked by an inner platform and an outer platform. These sectors are then fixed to circular ferrules.

It is clear that approach and connecting zones create geometrical imperfections in this arrangement, which disturb the flow of air through the high pressure turbine. These imperfections allow leaks to exist, which are prejuducial to the efficiency of the turbine engine.

The object of the invention is to obviate these disadvantages.

U.S. Pat. No. 4,126,405 discloses a segmented assembly of a turbine nozzle. The sectors are locked in rotation by studs 46 in FIG. 1 of the U.S. patent. Sealing between each sector is ensured by tongues, which are located in the grooves of the platforms.

SUMMARY OF THE INVENTION

To this end, the main object of the invention is a turbine engine stator nozzle comprising vanes associated with one another by sectors, e.g. in pairs, inner platforms on each of which are fixed two vanes by a first end, outer platforms on which are fixed the two same vanes by their two other ends and means for retaining the sectors with respect to a stator case and in particular means for fixing in rotation, radial fixing means and axial fixing means.

According to the invention, the radial nozzle fixing means are flexible and permit a radial expansion, being constituted by an outer elastic joint fixed to the stator case and surrounding the nozzle sectors and the nozzle comprises means for fixing together the sectors, so that the nozzle maintains its one-piece character.

When peripheral studs are used as means for the fixing in rotation of the nozzle, the means for the mutual axial fixing of the sectors comprise blocks placed on the edge of the outer platforms and which are mutually displaced so as to permit a juxtaposing of the sectors, the blocks of two contiguous sectors being positioned axially against one another in order to lock in axial translation in one direction the two contiguous sectors and the studs placed outside each outer platform axially abut against clips of the elastic joint.

Preferably, said elastic joint has undulations.

In a second embodiment of the invention, the flexible, radial fixing means for the nozzle comprise for each sector a first half-clevis placed on the outer surface of each of the outer platforms, a second half-clevis fixed with respect to the stator case and a rod mounted so as to pivot in each half-clevis by a first end and fitted in pivoting manner with respect to the stator case by a second end.

Preferably, the first half-clevis is constituted by two rings each joined to a different sector, but adjacent to one another, so as to ensure that each sector is retained with respect to the others.

BRIEF DESCRIPTION OF THE DRAWING

The invention and its different technical characteristics will be better understood from reading the following description relative to the attached drawings, wherein show.

DESCRIPTION OF THE PREFERRED EMBODIMENTS

Figure 1:
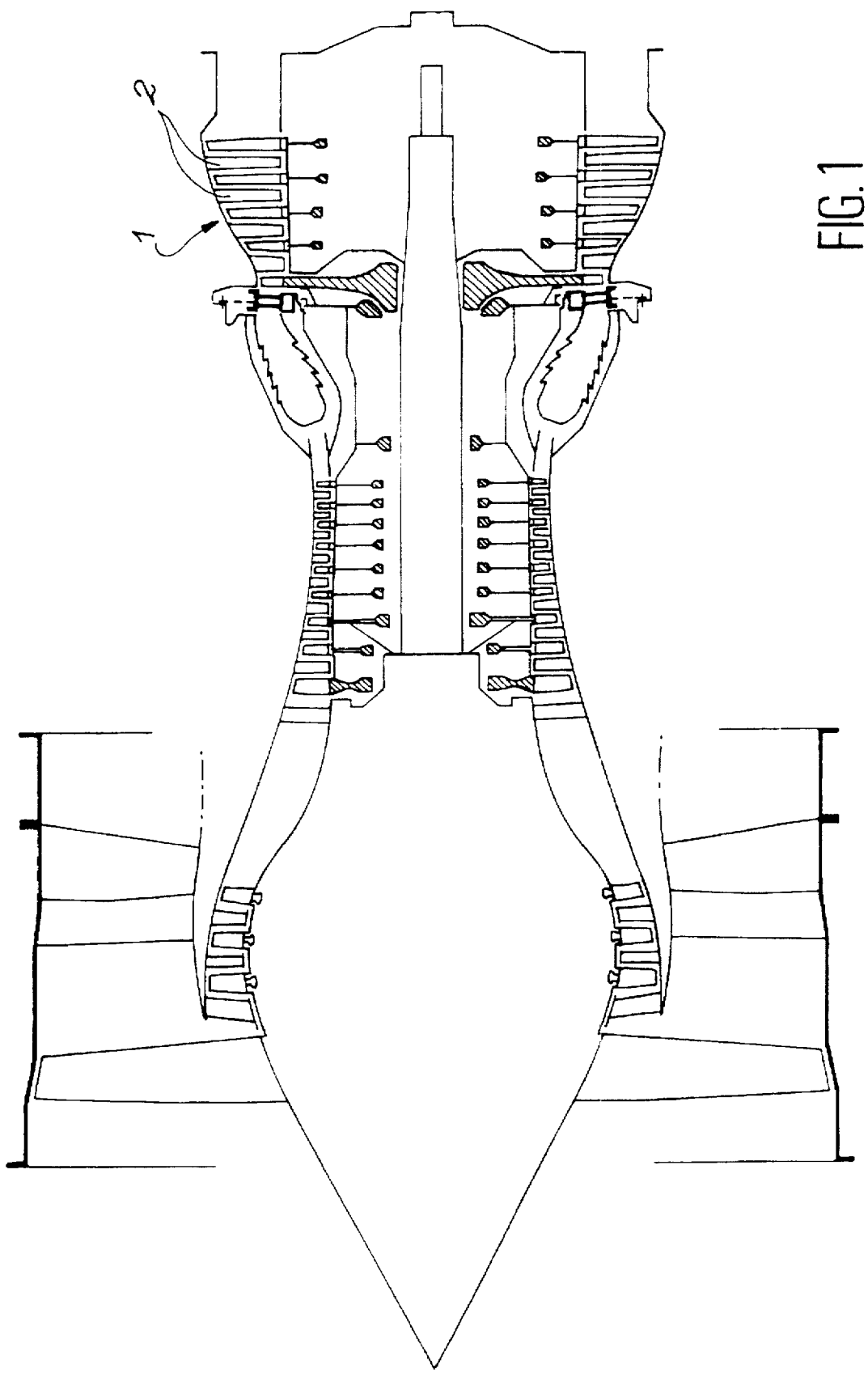
FIG. 1, in section, a civil turbojet using a nozzle according to the invention.
Figure 2:
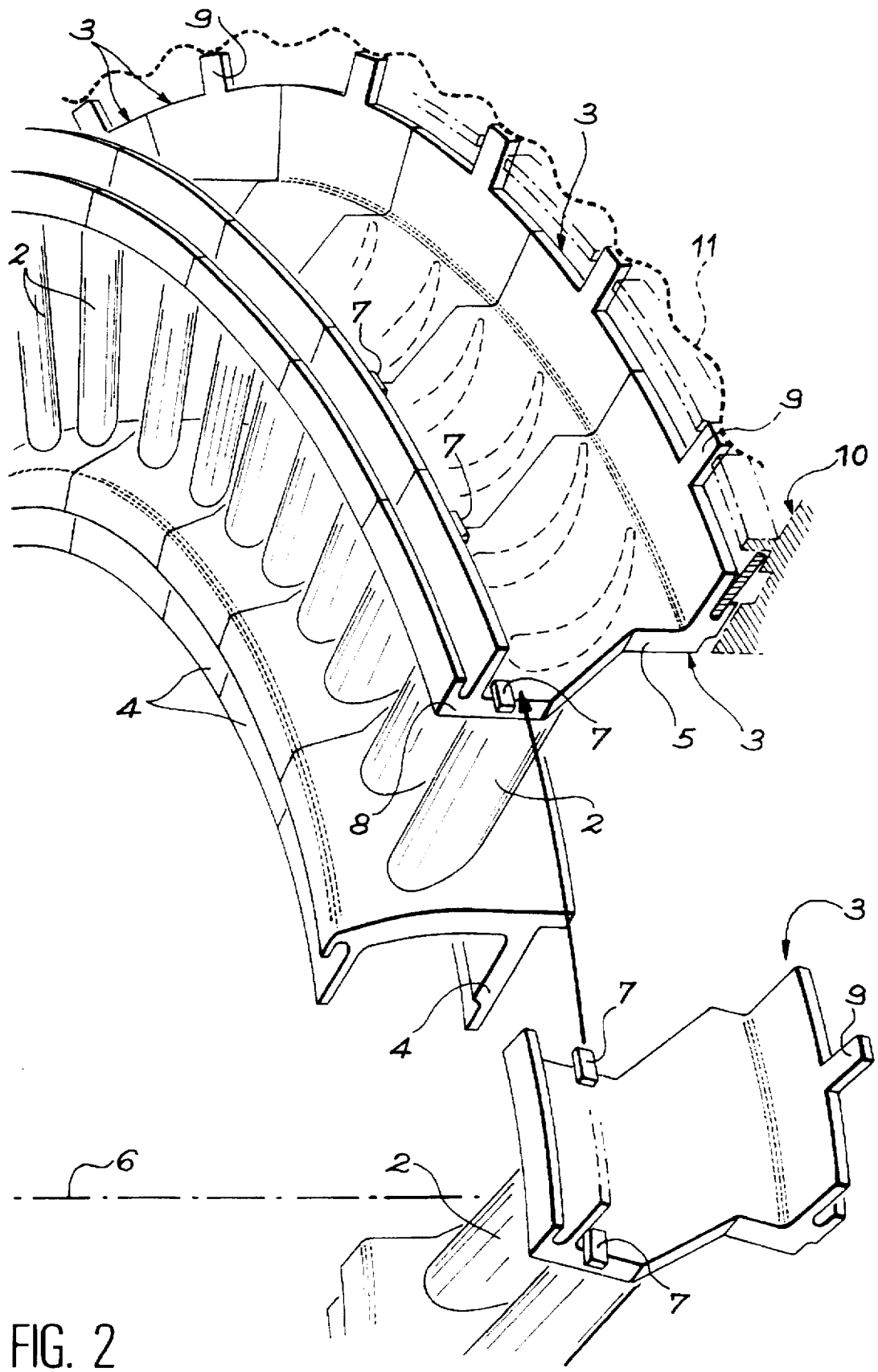
FIG. 2 A view of part of the nozzle according to the invention in a first embodiment.

FIG. 2 is a partial view of a first embodiment of the nozzle. It is possible to see the vanes 2 integral with inner 4 and outer 5 platforms. Thus, in this embodiment a sector 3 has two vanes 2, an inner platform 4 and an outer platform 5.

The sectors 3 are shown in contiguous form, but it is possible to move them apart, particularly when they are moving away from the centre of the nozzle, i.e. the turbine engine axis 6.

They are mutually axially positioned by blocks 7, each of which is placed on the two edges 8 of an upper platform 5 and which face one another when the sectors 3 are contiguous. The blocks 7 project beyond said edges B. However, they are fixed in displaced manner along the edge where they are located, so that the sectors 3 can be contiguous, the blocks 7 then being adjacent and thus forming an axial abutment in one direction for two contiguous sectors 3.

To prevent the axial displacement of two contiguous sectors in the other direction, use is made of peripheral studs 9 used for the blocking in rotation of the sectors 3. Thus, each peripheral stud 9 projects beyond an upper platform 5, so as to be able to reenter a not shown groove of the stator 10. Thus, all the sectors 3 are locked in rotation. The fact that the peripheral studs 9 project makes it possible to have a supplementary axial abutment.

Figure 3:
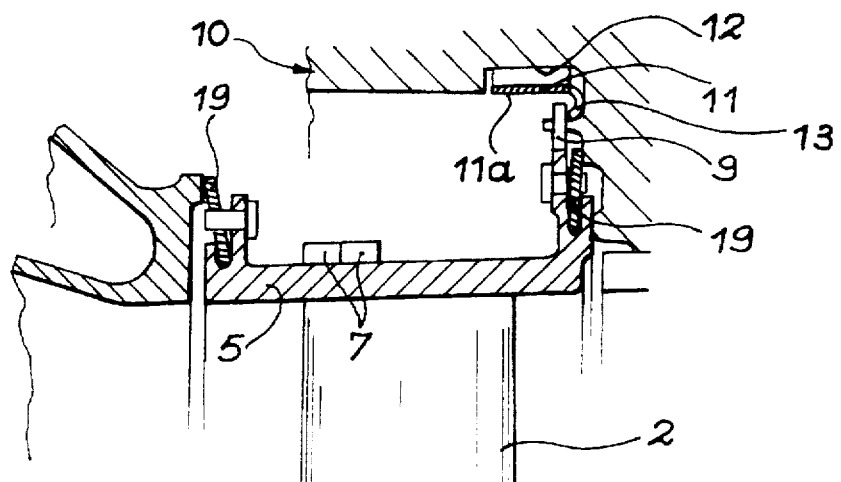
FIG. 3, in section, a detail of the construction of the nozzle of FIG. 2.
Figure 4:
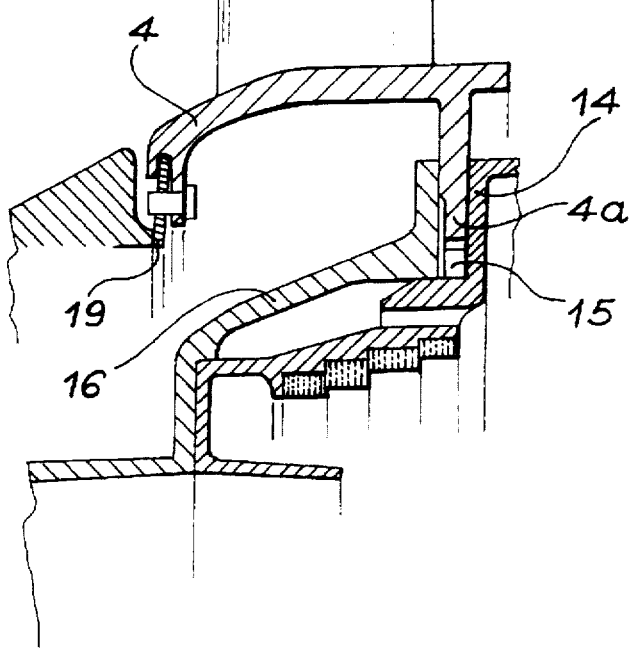
FIG. 4 A view of a detail of the nozzle of FIG. 2.
Figure 4:
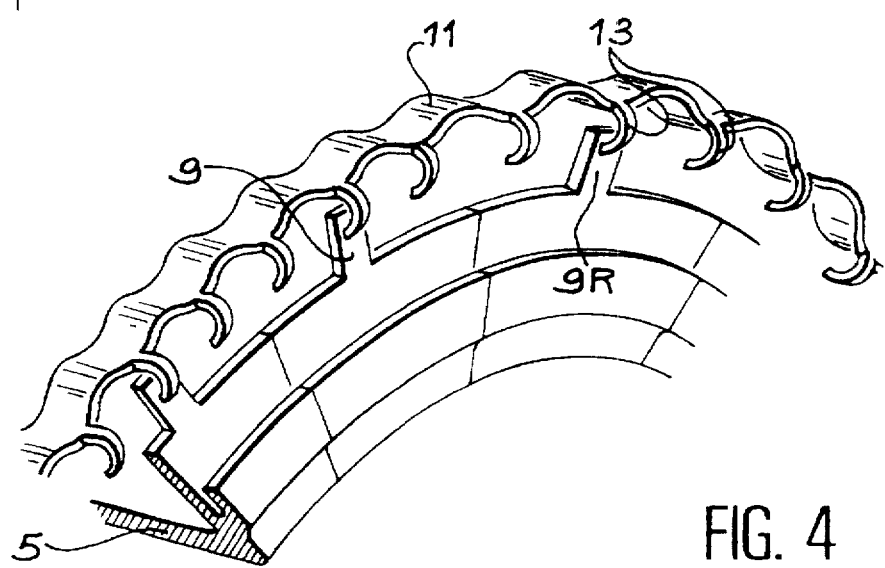

Reference should be made to FIGS. 3 and 4 for an understanding of how the peripheral studs 9 are used for forming an axial abutment.

FIG. 3 shows a vane 2 integral with its inner platform 4 and its outer platform 5. The assembly is held tightly in the stator case 10 by an elastic joint 11 placed around said sector and in particular around the peripheral studs 9. Thus, when the flexible joint 11 is installed, the peripheral studs 9 can touch the inner face 11A of the flexible joint 11 when each sector 3 is slightly moved away from the turbine engine axis.

The flexible joint 11 is positioned in an annular groove 12 of the case 10. It also has a series of inwardly curved clips 13 in order to form axial abutments against which abut the peripheral studs 9.

FIG. 4 perfectly shows this constructional detail, where it is possible to see the clips 13 abutting against the downstream, radial face 9R of the peripheral studs 9. Thus, each sector is blocked in axial translation both by the elastic joint 11 and one of the two adjacent sectors.

It is possible to see in FIG. 3 that a sector can slide radially, i.e. perpendicular to the axis of the turbine engine with respect to the stator case 10. Thus, there is a clearance between the elastic joint 11 and the top of the peripheral studs 9. There is also a radial clearance between the inner end 4A of the inner platform 4 and an inner ferrule 14 of the stator. There is also a guide groove 15 constituted by said inner ferrule 14 and the central hub 16 of the stator.

Thus, as a result of the blocks 7 and the peripheral studs 9, each sector is held axially and in rotation and is radially positioned with a slight clearance. However, as the sectors are axially positioned with respect to one another, the complete nozzle constitutes a one-piece ring. The compactness of the thus formed nozzle makes it possible to maintain an effective sealing system, so as to bring about a performance improvement on the part of the turbine engine.

The sealing of the complete nozzle is ensured by three sealing joints 19, whereof two are placed upstream and downstream of the upper platform 5 and whereof the third is positioned upstream of the inner platform 4.

Figure 5:
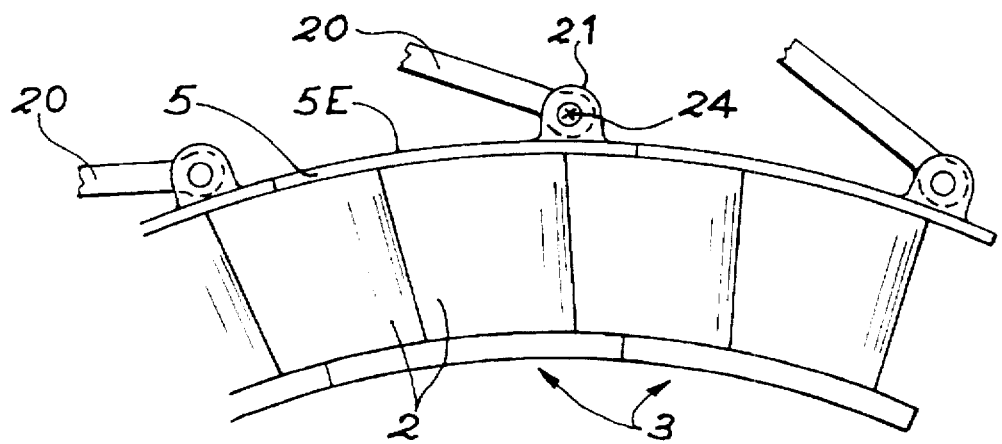
FIG. 5 A front view of part of the nozzle in a second embodiment.

With reference to FIG. 5 showing the second embodiment of the invention, the sectors 3 are provided on the outer surface SE of their outer platform 5 with a half-clevis 21, which enables a rod 20 to be fitted so as to pivot about an axis 24 parallel to the axis of the turbine engine by a first end.

Figure 6:
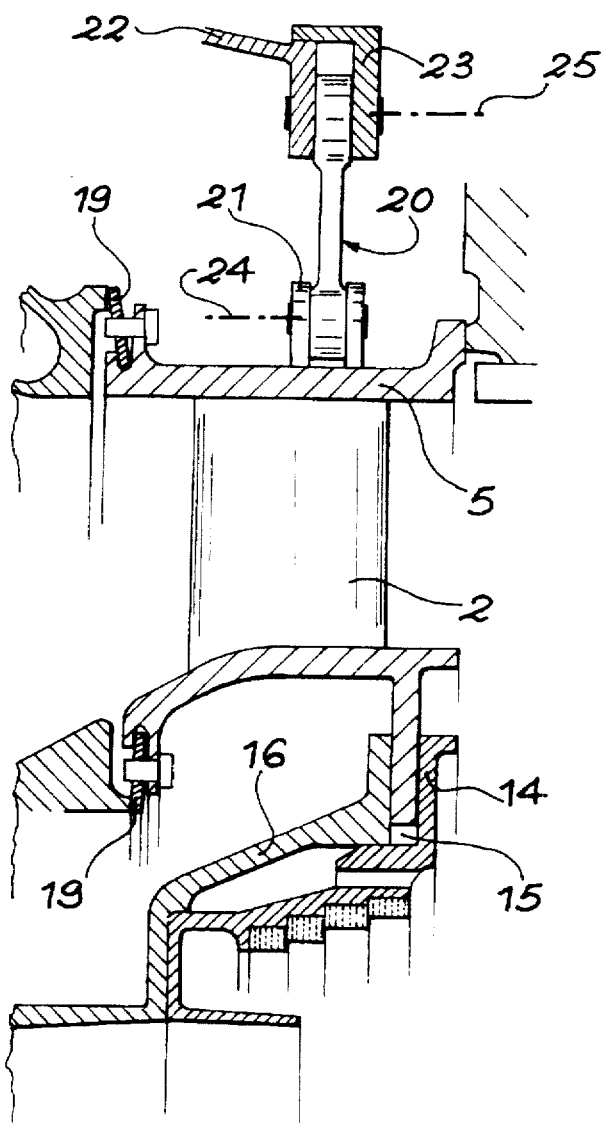
FIG. 6, in section, a constructional detail of the nozzle of FIG. 5.

With reference to FIG. 6, by its second end the rod 20 is also mounted so as to pivot in another half-clevis constituted by a bush 23 and a positioning part 22 fixed with respect to the not shown stator case. This pivoting also takes place about an axis 25 parallel to the axis 24.

Thus, each sector can have a slight freedom of movement in the radial direction and in rotation about the turbine engine axis. However, as the sectors 3 are juxtaposed, they still constitute a one-piece ring.

The slight displacement possible for each sector is also guided, as in the first embodiment, by a groove 15 defined by the inner ferrule 14 and the central hub 16 of the stator.

On the upstream side of each sector use is also made of sealing joints 19, as in the first embodiment.

Figure 7:
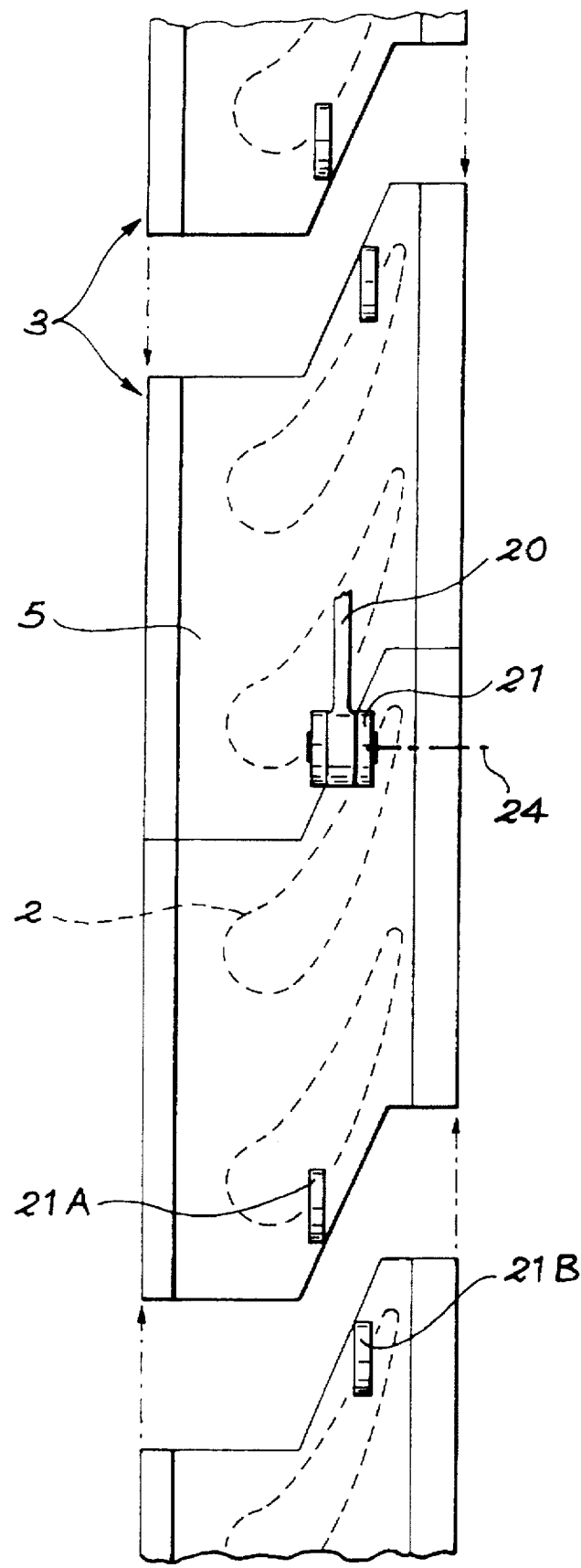
FIG. 7 A partial plan view of the nozzle of FIG. 5.

FIG. 7 is a plan view of the previously described embodiment. It is possible to see a rod 20 fitted in the first half-clevis 21 fixed on the outer platform 5 of a sector. It should be noted that each half-clevis 21 is constituted by two rings, each fixed to a different, adjacent sector 5. Thus, the half-clevises 21 fix together the sectors and are driven in rotation together. This fixing procedure ensures the one-piece character of the thus formed ring-shaped nozzle, whilst permitting a slight radial movement of each sector. This nozzle is more particularly appropriate for the stator of a high pressure turbine of a turbojet.

We claim:

1. A nozzle of a turbine stator of a turbine engine, comprising:

plural inner platforms;

plural outer platforms arranged facing said inner platforms;

plural vanes having inner ends and outer ends and arranged between said inner and outer platforms, at least two of said vanes being fixed to each said inner platform at said inner ends and fixed to each said outer platform at said outer ends to define a sector;

a maintaining unit which maintains each said sector with respect to a case of the turbine stator and connect said sectors together in order to unite the nozzle, said maintaining unit having a rotational maintaining element which maintains each said sector in a rotational direction around an axis of the turbine engine, a radial maintaining element which maintains each said sector in a radial direction of said turbine engine, and an axial maintaining element which maintains each said sector in an axial direction along said axis; and said radial maintaining element being flexible so as to permit a radial expansion of each said sector.

2. A nozzle according to claim 1, wherein said radial maintaining element comprises a first half-clevis placed on an outer surface of said outer platform, a second half-clevis fixed with respect to the case of the turbine stator and a rod having one end rotatably connected to said first clevis and another end rotatably connected to said second clevis.

3. A nozzle according to claim 2, wherein said first half-clevis has two rings, one ring being fixed to the sector and the other ring being fixed to another adjoining sector so as to maintain each sector with respect to the other.

* * * * *

UNITED STATES PATENT AND TRADEMARK OFFICE
CERTIFICATE OF CORRECTION

PATENT NO. : 5,752,804
DATED : May 19, 1998
INVENTOR(S) : Josette BENOIST, et al.

It is certified that error appears in the above-identified patent and that said Letters Patent is hereby corrected as shown below:

On the title page Item [73], Assignee's name is incorrect, it should read:

--Societe Nationale d'Etude et de Construction de Moteurs d'Aviation "SNECMA"--

Signed and Sealed this

Tenth Day of November 1998

Attest:

BRUCE LEHMAN

*Attesting Officer*        *Commissioner of Patents and Trademarks*